Sept. 4, 1956  R. H. JARVIS  2,761,298
FLEXIBLE TOOL COUPLING
Filed Sept. 9, 1953

INVENTOR.
Ralph Herbert Jarvis

United States Patent Office 2,761,298
Patented Sept. 4, 1956

2,761,298
FLEXIBLE TOOL COUPLING
Ralph Herbert Jarvis, Bell, Calif.
Application September 9, 1953, Serial No. 379,168
6 Claims. (Cl. 64—11)

This invention relates to a torque transmitting and flexible means for driving drills or reamers.

This invention is an improvement on the British patent, Bates, 567,553, February 20, 1945.

I find that the flexible drill and reamer, as described and claimed by Bates 567,553, February 20, 1945, to be impractical and not suitable for certain classes of drilling and reaming operations.

The following is a partial list of the advantages of the present invention over Bates 567,553:

1. Shorter drills and reamers can be used in my invention; the high-speed steel whereof drills and reamers are composed is expensive;

2. By using shorter drills and reamers in my invention, less heat is generated in the flexible drills or flexible reamers, and, likewise, in the drill bushings, wherein the drills or reamers operate. Consequently, the drills, reamers and drill bushings used in my invention last longer than drills, reamers and drill bushings used in Bates 567,553;

3. Since I use shorter drills and reamers in my invention, than Bates 567,553, and generate less heat in my drills and reamers, I can run with a minimum of clearance between the drill or reamer and a drill bushing. It is very important to have a minimum of clearance between the drill or reamer, and a drill bushing, when locating accurate drill holes in precision drill jigs and precision guide templates; guide templates contain a great many accurately-located holes and are used in conjunction with automatic presses, such as Weiderman, etc. By using my invention I can locate drill holes to closer tolerances in drill jigs and templates, than by using Bates 567,553;

4. The flexible means, for driving a drill or reamer, used in my invention is much stronger, than the flexible means described by Bates 567,553;

5. When using the flexible drills and flexible reamers, as described in my invention, since I use shorter drills or reamers, than Bates 567,553, I find that a rotating drill or reamer operates concentric with the driving means; i. e., or my drills or reamers have close co-axial alinement, between the revolving drill or reamer and the driving member; whereas, in Bates 567,553 centrifugal force throws the end of the rotating drill from concentricity with the driving means; especially, drills or reamers revolving at high speed become unmanageable in Bates 567,553.

Other differences between Bates 567,553 and the present invention will be obvious, during the description of the present invention.

The objects of the present invention are the following:

1. The locating of precision drill holes in drill jigs and templates;

2. The drilling of holes in difficult locations; i. e., holes, that are drilled at present by angle-drilling attachments with portable drill motors, can be drilled with my invention without the use of said angle-drilling attachments;

3. By using the present invention the drill bushings used, especially in aircraft jigs and fixtures, wear longer, than when using rigid drills or reamers.

Other objects will be apparent from the following description and the accompanying drawings in which.

Figure 1:
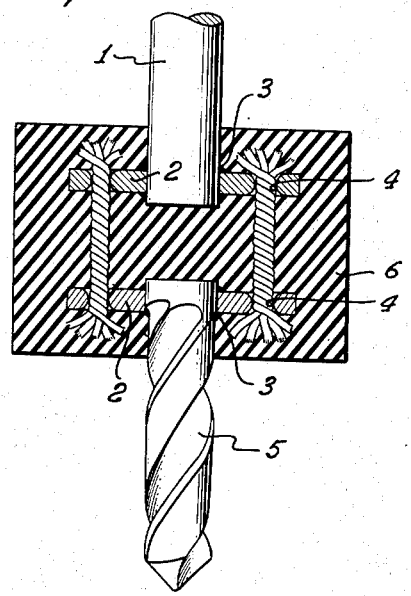
Figure 1 is an elevation, partly in section, of a flexible drill used in my invention.

Referring to Figure 1: 1 is a broken-off metal member, suitable for fixing a drill chuck of a portable electric or air drill thereto, or other suitable source of power. 3 are brazes or welds for fixing 1 to 2; 2 being a round metal plate with approximately equi-spaced holes 4 formed therein; the edges of holes 4 are rounded and, likewise, polished. 5 is a twist drill fixed to plate 2 by brazes or welds 3. 6 is rubber or other resilient material, which fixes the upper plate 2 and 1 to bottom plate 2 and drill 5, 5 and 1, being in co-axial alinement.

Figure 2:
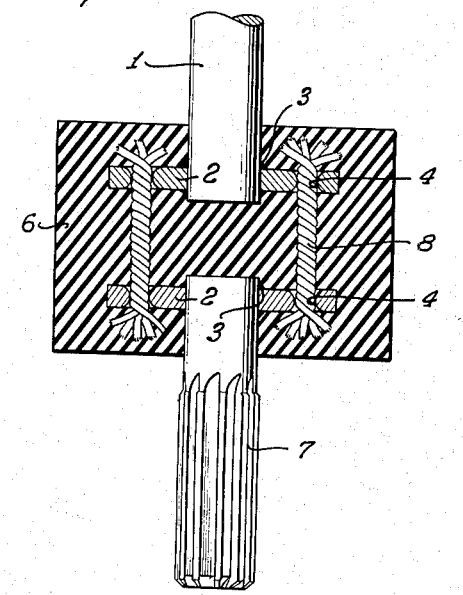
Figure 2 is an elevation, partly in section, of a flexible reamer used in my invention.

Referring to Figure 2: 1 is a broken-off metal member, suitable for fixing a drill chuck of a portable electric or air drill thereto, or other suitable source of power. 3 are brazes or welds for fixing 1 to 2; 2 being a round metal plate with approximately equi-spaced holes 4 formed therein; the edges of holes 4 are rounded and polished. 7 is a reamer fixed to plate 2 by brazes or welds 3. 6 is rubber or other resilient material which fixes the upper plate 2 and 1 to bottom plate 2 and reamer 7, 1 and 7, being in co-axial alinement. 8 are pieces of braided fibrous material, which pass through holes 4, the ends thereof, being frayed.

Figure 3:
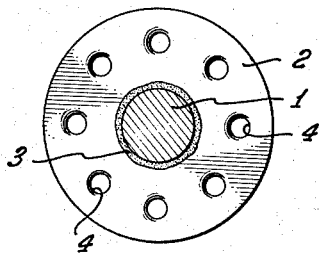
Figure 3 is a plan view of a metal member used, in one embodiment of my invention.

Referring to Figure 3: 1 is a section of a metal member suitable for fixing a drill chuck of a portable electric or air drill thereto, or other suitable source of power. 2 is a metal plate with eight holes 4 formed therein; the edges of holes 4 are rounded and polished smooth. 3 are brazes or welds for fixing 1 to 2.

Figure 4:
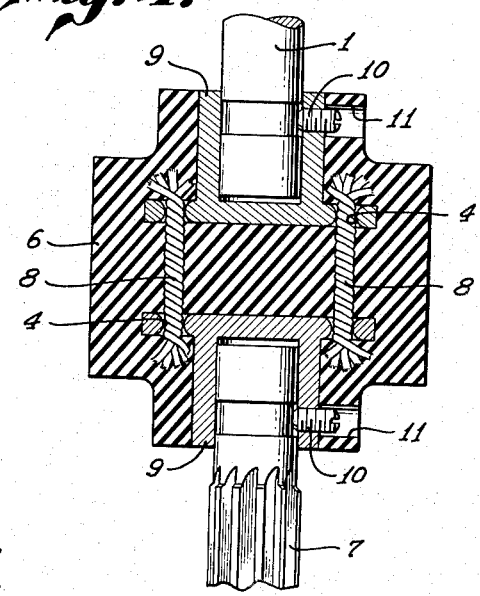
Figure 4 is an elevation, partly in section, showing another embodiment of my invention.

Referring to Figure 4: 1 is a broken-off metal member suitable for fixing a drill chuck of a portable electric or air drill thereto, or other suitable source of power. 1 is fixed to 9 by setscrew 10; 1 is undercut or turned smaller where setscrew 10 touches 1. There are internal screw threads formed in 9; wherein the external screw threads formed on 10 fit. 4 are holes formed in the base of 9; the edges of holes 4 are rounded and polished smooth. 7 is a broken-off reamer fixed to 9 by setscrew 10. 8 are pieces of braided fibrous material, which pass through holes 4, the ends thereof, being frayed. 11 are holes in the resilient material 6, wherethrough setscrews 10 are adjusted with a screw driver.

Figure 5:
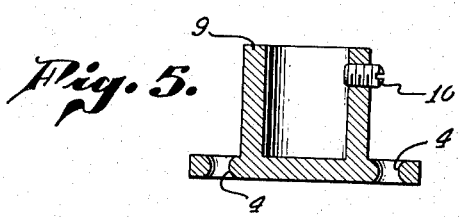
Figure 5 is an elevation, in section, the section, being through the approximate center of the member; said member is used in one embodiment of my invention.

Referring to Figure 5: 9 is a member and is composed of a cylindrical member formed on a circular member, the circular member, having approximately equi-spaced holes 4 with rounded smooth edges formed therein. 10 is a setscrew.

In my invention, I may vary the flexibility of the drill or reamer, considerably. For illustration, when I am locating precision holes in drill jigs or guide templates to within tolerances of, i. e., about .0005 inch, then I desire a flexible drill or flexible reamer having maximum flexibility; by employing a flexible drill or reamer with maximum flexibility I am able to obtain a minimum of heat in the flexible drill or flexible reamer, during drilling or reaming operations. I find it essential to keep the flexible drill or flexible reamer from heating, during drilling operations; for provided, the flexible drill or flexible reamer heats during drilling or reaming operations they expand. Provided, the flexible drill or flexible reamer heat and expand, during drilling or reaming operations, I cannot operate said flexible drill or flexible reamer within a drill bushing with a minimum of clearance.

I find it necessary to operate a flexible drill or flexible reamer in a drill bushing with clearance of about .0001 inch, provided, I use drills or reamers of average manufacturers' grind finish; provided, I locate drill holes within close tolerances in drill jigs, templates, etc.

I find, provided, I use flexible drills, flexible reamers and drill bushing having super-finish grind finish, then .00005 inch clearance is sufficient between the drill or reamer and a drill bushing. By using reamers, drills and bushings in my invention with super-finish grind finish, then I can locate holes in drill jigs and templates to tolerances of about .0002 inch.

Since I can use my invention in a multitude of operations in the manufacture of airplane and other metal products, I find it necessary to change the flexibility of my flexible drills and flexible reamers under certain conditions; i. e., some manufacturing operations require a very flexible drill or flexible reamer; other manufacturing operations require flexible drills and flexible reamers with co-axial alinement; i. e., referring to Figures 1, 2 and 4, wherein members 1, 5 and 7 are in about perfect co-alinement.

For illustration, in aircraft manufacturing large major jigs, whereon wing sections are fabricated, have a great many holes therein, called attaching holes. I find, provided, I use a flexible drill, as described in my invention, to drill said attaching holes, the flexible drill must be in about perfect co-axial alinement between, referring to Figure 1, members 1 and 5. The reason for said above about perfect co-axial alinement of members 1 and 5 is as follows. There are a great many of these attaching holes in the airplane wing section and they are close together. Provided, I use a flexible drill with about perfect co-axial alinement, referring to Figure 1, between members 1 and 5; then the drilling end of member 5 does not wobble or form an eccentric path when revolving rapidly. When the drilling end of 5 does not wobble or form an eccentric path, when revolving rapidly, then an operator, drilling said attaching holes, can move from one drill bushing to another quickly; drill bushings guide the flexible drill during the drilling operations of said attaching holes.

In regards to the resilient material, referring to Figures 1, 2 and 4, wherein 6 is the resilient material, suitable for my invention. I may employ natural rubbers or synthetic rubbers; or mixtures of natural and synthetic rubbers. Likewise, I may use resilient materials which are not classified as rubber, such as leather, felt, cloth, etc.

In Figures 1, 2 and 4, I show resilient material which is homogeneous in composition. I may use resilient material or materials, which are not homogeneous in composition. Likewise, I may employ resilient materials in laminar construction in my invention.

Resilient materials are bonded to metals by a multiplicity of methods, and it is an old art, consequently, I reserve the right to bond the resilient material or materials to the metal members employed in my invention by any bonding process which is old in the arts.

Referring to Figures 1, 2 and 4. In said figures I show embodiments of my invention with reinforcing material in the resilient material. I may or may not use reinforcing material in my invention. In the figures, 8 are braided fibrous material the ends thereof, above and below the members 2, being frayed.

Again, I may use mixtures of fibrous materials of braided construction to reinforce the resilient material or materials, employed in my invention; i. e., mixtures of nylon and rayon, nylon and orlon, cotton and linen, etc.

Additionally, I may use fibrous material which is not braided to reinforce the resilient material or materials, employed in my invention.

Additionally, I may use mixtures of fibrous materials which are not braided to reinforce the resilient material or materials, employed in my invention.

Referring to Figures 1, 2 and 4: In Figure 1, 1 and 5 are fixed to 2 by brazes or welds 3. In Figure 2, 1 and 7 are fixed to 2 by brazes or welds 3. In Figure 4, 1 and 7 are fixed to 9 by setscrews 10.

In the construction employed in my invention in Figures 1 and 2, provided members 1, 5 or 7 wear out or become damaged during use, I cannot replace them with new members, without destroying the resilient material.

In Figure 4, provided 1 or 7 become damaged during use, I can replace 7 or 1 with new members.

I may employ other means of fixing the metal members of my invention beside welds, brazes and setscrews.

Referring to Figure 3: I show eight holes 4 in 2. As can be readily understood, the number of holes formed in 2 can be varied or changed.

Having described my invention, I declare that what I claim and desire to secure by Letters Patent is:

1. A flexible means for driving a drill, which comprises a body of resilient enveloping material, longitudinally spaced internal circular elements in co-axial alignment in said body, said longitudinally spaced internal circular elements having a plurality of holes therein, the edges of said holes being rounded and smooth, fibrous material passing through said holes, means for fixing a drill to one of said longitudinally spaced internal circular elements, and means for fixing a source of power to the other said longitudinally spaced internal circular element; said drill and said element suitable to fix a source of power thereto, being in co-axial alignment with said circular elements.

2. A flexible means for driving a reamer, which comprises a body of resilient enveloping material, longitudinally spaced internal circular elements in co-axial alignment in said body, said longitudinally spaced internal circular elements having a plurality of holes therein, the edges of said holes being rounded and smooth, fibrous material passing through said holes, means for fixing a reamer to one of said longitudinally spaced internal circular elements, and means for fixing a source of power to the other said longitudinally spaced internal circular element; said reamer and said element suitable to fix a source of power thereto, being in co-axial alignment with said circular elements.

3. A flexible means for driving a drill, which comprises a body of resilient enveloping material, longitudinally spaced internal circular elements in co-axial alignment in said body, said longitudinaly spaced internal circular elements having a plurality of holes therein, the edges of said holes being rounded and smooth, fibrous material passing through said holes the ends of said fibrous material being frayed, means for fixing a drill to one of said longitudinally spaced internal circular elements, and means for fixing a source of power to the other said longitudinally spaced internal circular element; said drill and said element suitable to fix a source of power thereto, being in co-axial alignment with said circular elements.

4. A flexible means for driving a reamer, which comprises a body of resilient enveloping material, longitudinally spaced internal circular elements in co-axial alignment in said body, said longitudinally spaced internal circular elements having a plurality of holes therein, the edges of said holes being rounded and smooth, fibrous material passing through said holes the ends of said fibrous material being frayed, means for fixing a reamer to one of said longitudinally spaced internal circular elements, and means for fixing a source of power to the other said longitudinally spaced internal circular element; said reamer and said element suitable to fix a source of power thereto, being in co-axial alignment with said circular elements.

5. A flexible means for driving a tool as above described, which comprises a body of resilient enveloping material, longitudinally spaced internal circular elements in co-axial alignment in said body, said longitudinally spaced internal circular elements having a plurality of holes therein, the edges of said holes being rounded and smooth, fibrous material passing through said holes, means for fixing a tool to one of said longitudinally spaced internal circular elements, and means for fixing a source of power to the other said longitudinally spaced internal circular element; said tool and said element suitable to fix a source of power thereto, being in co-axial alignment with said circular elements.

6. A flexible means for driving a tool as above described, which comprises a body of resilient enveloping material, longitudinally spaced internal circular elements in co-axial alignment in said body, said longitudinally spaced internal circular elements having a plurality of holes therein, the edges of said holes being rounded and smooth, fibrous material passing through said holes the ends of said fibrous material being frayed, means for fixing a tool to one of said longitudinally spaced internal circular elements, and means for fixing a source of power to the other said longitudinally spaced internal circular element; said tool and said element suitable to fix a source of power thereto, being in co-axial alignment with said circular elements.

References Cited in the file of this patent

UNITED STATES PATENTS

| | | | |
|---|---|---|---|
| 1,867,484 | Wolfe et al. | | July 12, 1932 |
| 2,166,376 | Saurer | | July 18, 1939 |
| 2,525,580 | Beler | | Oct. 10, 1950 |
| 2,542,154 | Mesirow | | Feb. 20, 1951 |

FOREIGN PATENTS

| | | |
|---|---|---|
| 567,553 | Great Britain | 1945 |